tent No.: US 8,120,909 B2
(45) Date of Patent: Feb. 21, 2012

(12) United States Patent
Fu et al.

(54) COMPUTER SYSTEM WITH AIRFLOW GUIDING DUCT

(75) Inventors: Jian Fu, Shenzhen (CN); Xiao-Su Zhu, Shenzhen (CN); Zhi-Jiang Yao, Shenzhen (CN); Li-Fu Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 177 days.

(21) Appl. No.: 12/697,304

(22) Filed: Feb. 1, 2010

(65) Prior Publication Data
US 2011/0090641 A1  Apr. 21, 2011

(30) Foreign Application Priority Data

Oct. 16, 2009  (CN) .................. 2009 2 0312638 U

(51) Int. Cl.
*H05K 7/20* (2006.01)
(52) U.S. Cl. ................ 361/695; 361/679.47; 361/679.5; 361/694
(58) Field of Classification Search ............. 361/679.49, 361/679.51, 694, 695
See application file for complete search history.

(56) References Cited

U.S. PATENT DOCUMENTS

| 6,299,408 | B1 * | 10/2001 | Bhatia ........................... 415/176 |
| 6,400,568 | B1 * | 6/2002 | Kim et al. ..................... 361/697 |
| 6,765,794 | B1 * | 7/2004 | Inoue ............................ 361/695 |
| 6,951,446 | B2 * | 10/2005 | Hung ......................... 415/213.1 |
| 7,403,388 | B2 * | 7/2008 | Chang .......................... 361/695 |
| 7,643,292 | B1 * | 1/2010 | Chen ............................. 361/695 |
| 2004/0022021 | A1 * | 2/2004 | Bovino ......................... 361/683 |
| 2004/0085731 | A1 * | 5/2004 | Lo et al. ........................ 361/695 |
| 2005/0030712 | A1 * | 2/2005 | Faneuf et al. ................. 361/687 |
| 2008/0074842 | A1 * | 3/2008 | Tracy et al. .................. 361/695 |
| 2008/0101018 | A1 * | 5/2008 | Long et al. .................... 361/695 |
| 2008/0174957 | A1 * | 7/2008 | Lev ............................... 361/694 |

* cited by examiner

*Primary Examiner* — Gregory Thompson
(74) *Attorney, Agent, or Firm* — Altis Law Group, Inc.

(57) ABSTRACT

A computer system includes a chassis, a motherboard, a heat sink and an airflow guiding duct. The chassis includes a chassis bottom wall, a first chassis sidewall, and a second chassis sidewall. The first chassis sidewall defines a first ventilation hole. The second chassis sidewall defines a second ventilation hole. The motherboard with a chip is secured to the chassis bottom wall. The heat sink is secured to the motherboard for cooling the chip. The airflow guiding duct is configured to guide airflow flowing from the second ventilation to the first ventilation hole. A fan is received inside the airflow guiding duct.

20 Claims, 3 Drawing Sheets

COMPUTER SYSTEM WITH AIRFLOW GUIDING DUCT

BACKGROUND

1. Technical Field

The present disclosure relates to a computer system with an airflow guiding duct.

2. Description of Related Art

A heat sink is secured to a motherboard of a computer system for cooling a CPU on the motherboard. With computer systems getting smaller and the CPU's generating more heat, standard heat sinks are not appropriate to handle the extra heat generated by the CPU.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
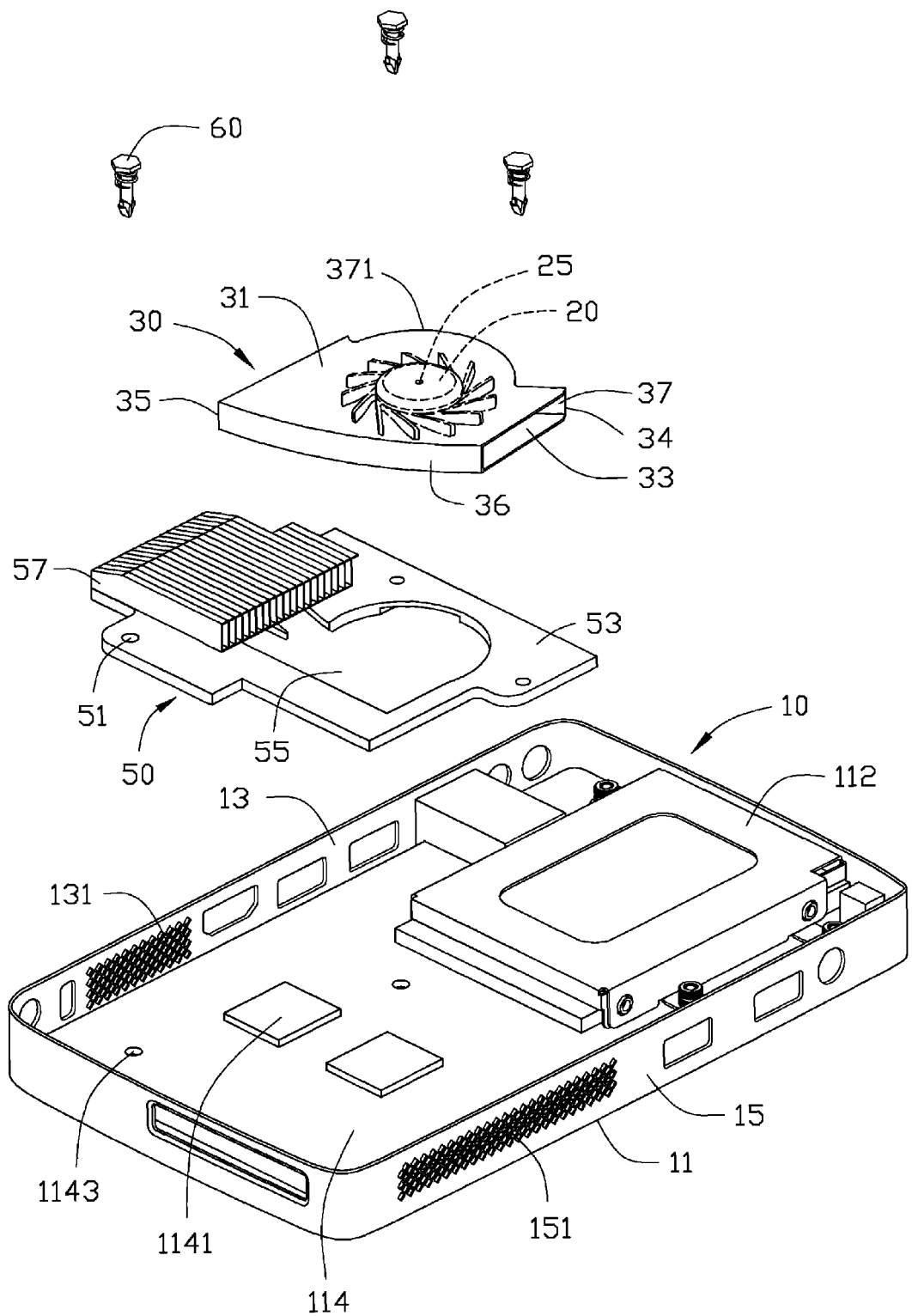
FIG. 1 is an exploded, isometric view of a computer system in accordance with an embodiment.

Referring to FIG. 1, a computer system in accordance with an embodiment includes a chassis 10, a motherboard 114, an airflow guiding duct 30, and a heat sink 50.

The chassis 10 includes a chassis bottom wall 11, a first chassis sidewall 13, and a second chassis sidewall 15. The first chassis sidewall 13 defines a plurality of first ventilation holes 131. The second chassis sidewall 15 defines a plurality of second ventilation holes 151.

The motherboard 114 is fixed on an inner surface of the chassis bottom wall 11. Two chips 1141, such as CPU's, are secured to the motherboard 114. A plurality of fixing holes 1143 is defined in the motherboard 114. A disk drive, such as hard disk drive 112, is mounted in the chassis 10 above the motherboard 114 to one side of the chips 1141.

The heat sink 50 includes a main body 53 and a fin portion 57 secured to the main body 53. A plurality of through holes 51 is defined in the main body 53. A through slot 55 is defined in the main body 53 for receiving the chips 1141 of the motherboard 114.

The airflow guiding duct 30 includes a duct top wall 31, a duct bottom wall 33, a first duct sidewall 36 and a second duct sidewall 37, which together define an airflow channel. In one embodiment, the duct top wall 31 is parallel to the duct bottom wall 33. An inlet 34 is defined in the airflow guiding duct 30 at an end, and an outlet 35 is defined in an opposite end. The inlet 34 is smaller than the outlet 35. The first duct sidewall 36 is paraboloids, and the second duct sidewall 37 has an arc-shaped portion 371. A fan 20 is fixed in the airflow guiding duct 30 with a shaft 25. The shaft 25 is secured to the duct top wall 31 and the duct bottom wall 33.

Figure 2:
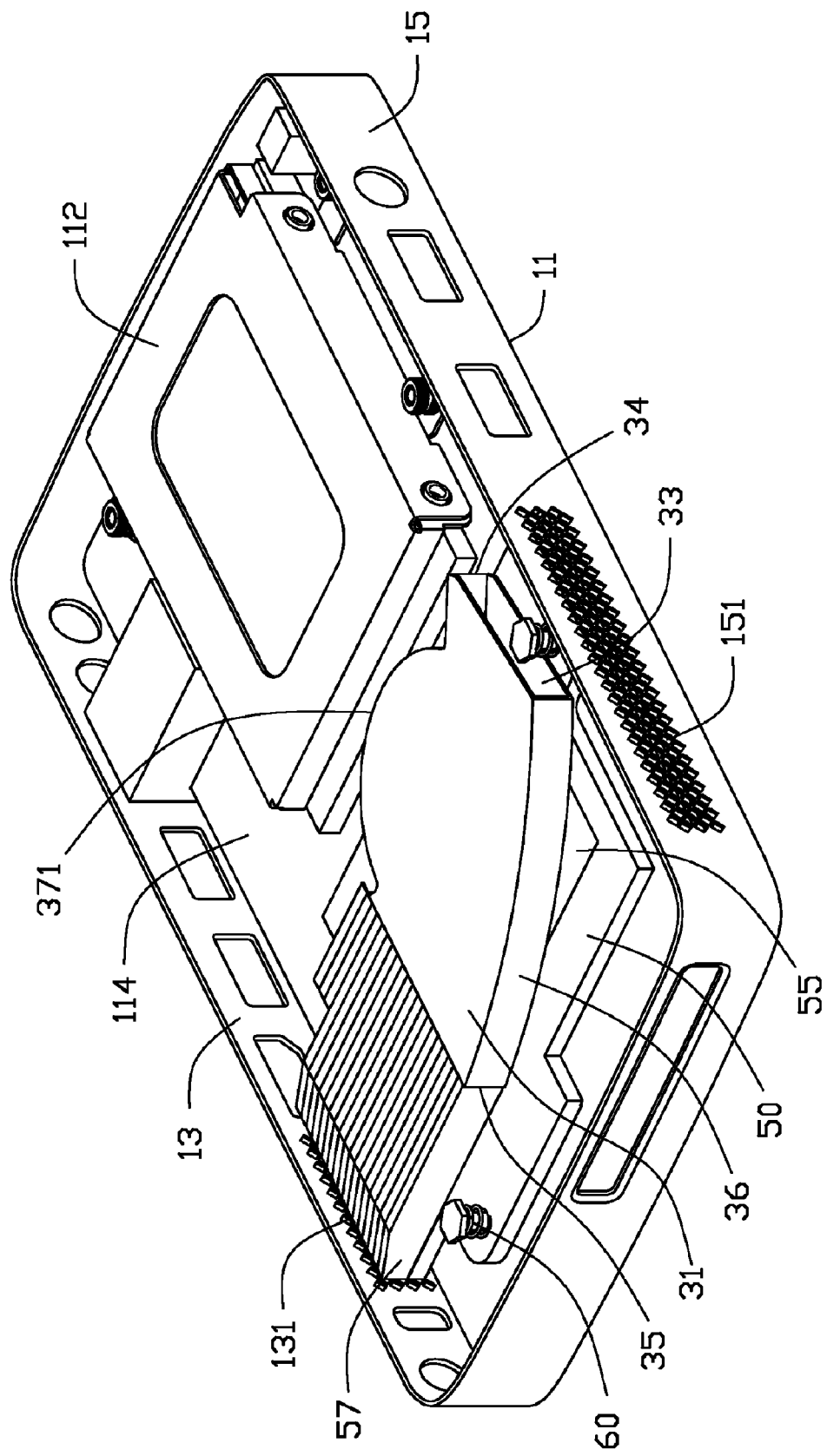
FIG. 2 is an assembled view of the computer system of FIG. 1.

Referring also to FIG. 2, in assembly, the airflow guiding duct 30 is fixed on the main body 53 of the heat sink 50 at a side of the fin portion 57. In one embodiment, the airflow guiding duct 30 is fixed on the main body 53 with an adhesive. The outlet 35 faces the fin portion 57. In one embodiment, the edge of the outlet 35 abuts against the fin portion 57. In another embodiment, a distance can be defined between the edges of the outlet 35 and the fin portion 57, but the outlet 35 is substantially close to the fin portion 57. The heat sink 50 together with the airflow guiding duct 30 is placed on the motherboard 114. The chips 1141 are received in the through slot 55 of the heat sink 50. The fin portion 57 is substantially close to the first ventilation holes 131 of the first chassis sidewall 13. The inlet 34 faces the second ventilation holes 151 of the second chassis sidewall 15. The through holes 51 of the heat sink 50 align with the fixing holes 1143 of the motherboard 114. A plurality of fasteners 60 are fastened in the through holes 51 and the fixing holes 1143, to secure the heat sink 50 on the motherboard 114.

Figure 3:
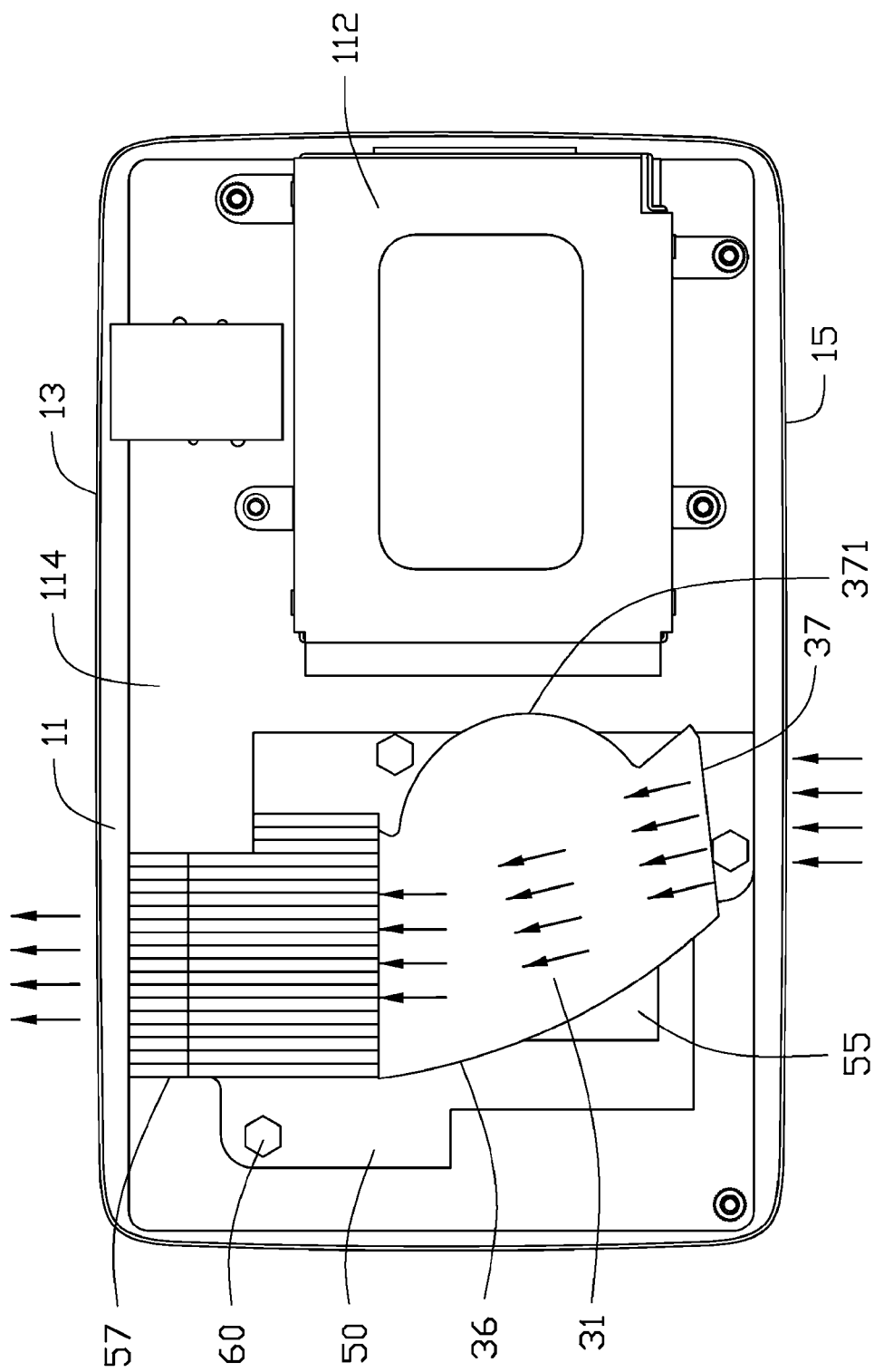
FIG. 3 is a top view of the computer system of FIG. 2.

Referring also to FIG. 3, in use, air flows in the chassis 10 via the second ventilation holes 151. The fan 20 is turned on so that air flows through the airflow guiding duct 30 from the inlet 34 to the outlet 35. Then the airflow guiding duct 30 allows air to flow through the fin portion 57, and out of the chassis 10 via the first ventilation holes 131. Therefore, the chips 1141 of the motherboard 114 can be cooled.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
    a chassis comprising a chassis bottom wall, a first chassis sidewall, and a second chassis sidewall; the first chassis sidewall defining a first ventilation hole; the second chassis sidewall defining a second ventilation hole;
    a motherboard with a chip secured to the chassis bottom wall;
    an airflow guiding duct configured to guide airflow flowing from the second ventilation to the first ventilation hole, the airflow guiding duct comprising a duct top wall, and a duct bottom wall parallel to the duct top wall; and
    a fan received inside the airflow guiding duct, the fan being rotatable about a shaft; and the shaft being secured to the duct top wall and the duct bottom wall.

2. The electronic device of claim 1, wherein the airflow guiding duct defines an inlet facing the second ventilation hole of the second chassis sidewall, and the airflow guiding duct defines an outlet facing the first ventilation hole; the outlet is greater than the inlet; and the fan is positioned between the inlet and the outlet.

3. The electronic device of claim 2, further comprising a heat sink for cooling the chip, wherein the heat sink comprises a main body secured to the motherboard, and a fin portion secured to the main body; and the fin portion is substantially close to the first ventilation hole.

4. The electronic device of claim 3, wherein edges of the outlet abuts the fin portion, and edges of the outlet are substantially close to the fin portion.

5. The electronic device of claim 3, wherein the main body defines a through opening receiving the chip of the motherboard.

6. The electronic device of claim 1, wherein the airflow guiding duct comprises a first duct sidewall and a second duct sidewall; and the fan is secured between the first duct sidewall and the second duct sidewall.

7. The electronic device of claim 6, wherein the first duct sidewall is paraboloids, and the second duct sidewall has an arc-shaped portion.

8. A computer system comprising:
- a chassis comprising a chassis bottom wall, a first chassis sidewall, and a second chassis sidewall; the first chassis sidewall defining a first ventilation hole; the second chassis sidewall defining a second ventilation hole;
- a motherboard with a chip secured to the chassis bottom wall;
- a heat sink secured to the motherboard for cooling the chip;
- an airflow guiding duct configured to guide airflow flowing from the second ventilation to the first ventilation hole; the airflow guiding duct comprising a duct top wall, a duct bottom wall parallel to the duct top wall, a first duct sidewall, and a second duct sidewall; the first duct sidewall and the second sidewall connecting the duct bottom wall and the duct top wall; and
- a fan attached to the airflow guiding duct, the fan being rotatable about a shaft; the shaft secured to the duct top wall and the duct bottom wall.

9. The computer system of claim 8, wherein the airflow guiding duct defines an inlet, which is surrounded by adjacent edge of the duct top wall, the duct bottom wall, the first duct sidewall and the second duct sidewall; and the inlet faces the second ventilation hole of the second chassis sidewall.

10. The computer system of claim 9, wherein the airflow guiding duct defines an outlet, which is surrounded by another adjacent edges of the duct top wall, the duct bottom wall, the first duct sidewall and the second duct sidewall; the outlet is greater than the inlet, and faces the first ventilation hole.

11. The computer system of claim 10, wherein the heat sink comprises a main body secured to the motherboard, and a fin portion secured to the main body; and the fin portion is substantially close to the first ventilation hole.

12. The computer system of claim 11, wherein edges of the outlet abuts the fin portion.

13. The computer system of claim 11, wherein edges of the outlet are substantially close to the fin portion.

14. The computer system of claim 11, wherein the main body defines a through opening receiving the chip of the motherboard.

15. The computer system of claim 8, wherein the first duct sidewall is paraboloid.

16. The computer system of claim 8, wherein the second duct sidewall has an arc-shaped portion.

17. The computer system of claim 1, wherein the duct top wall and the duct bottom wall are parallel to the chassis bottom wall, and parallel to the first and second chassis sidewalls.

18. A computer system comprising:
- a chassis comprising a chassis bottom wall, a first chassis sidewall, and a second chassis sidewall; the first chassis sidewall defining a first ventilation hole; the second chassis sidewall defining a second ventilation hole;
- a motherboard secured to the chassis bottom wall;
- an airflow guiding duct configured to guiding airflow flowing from the second ventilation to the first ventilation hole; the airflow guiding duct comprising a duct top wall, and a duct bottom wall opposite to the duct top wall; and
- a fan received inside the airflow guiding duct, the fan being rotatable about a shaft, and the shaft secured to the duct top wall and the duct bottom wall, wherein the shaft is perpendicular to the chassis bottom wall and parallel to the first and second chassis sidewalls.

19. The computer system of claim 18, wherein the airflow guiding duct further comprises a first duct sidewall and a second duct sidewall; and the first duct sidewall and the second sidewall connecting the duct bottom wall and the duct top wall; the airflow guiding duct defines an inlet, which is surrounded by adjacent edge of the duct top wall, the duct bottom wall, the first duct sidewall and the second duct sidewall; the airflow guiding duct defines an outlet, which is surrounded by another adjacent edges of the duct top wall, the duct bottom wall, the first duct sidewall and the second duct sidewall; the outlet is greater than the inlet; and the fan is located between the inlet and the outlet.

20. The computer system of claim 18, wherein the duct top wall and the duct bottom wall are parallel to the chassis bottom wall, and parallel to the first and second chassis sidewalls.

* * * * *